July 16, 1957 — C. E. HASTINGS — 2,799,460
REMOTE CONTROL APPARATUS
Original Filed Sept. 19, 1945 — 3 Sheets-Sheet 1

Inventor
Charles E. Hastings

July 16, 1957  C. E. HASTINGS  2,799,460
REMOTE CONTROL APPARATUS
Original Filed Sept. 19, 1945  3 Sheets-Sheet 2
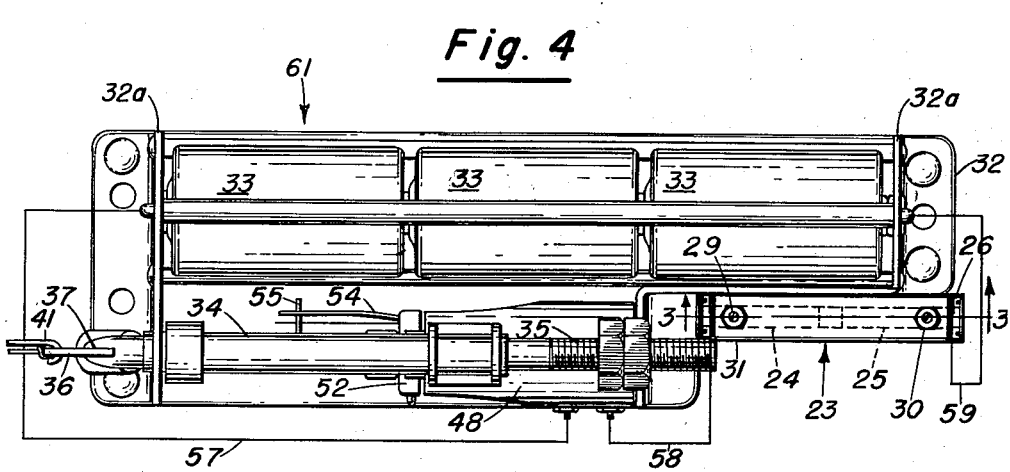
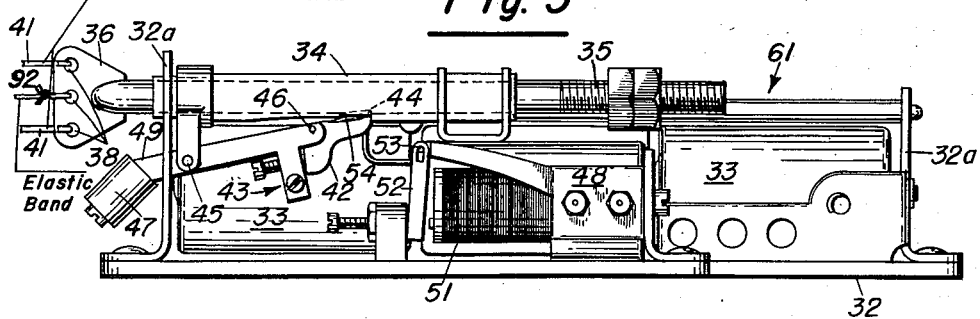
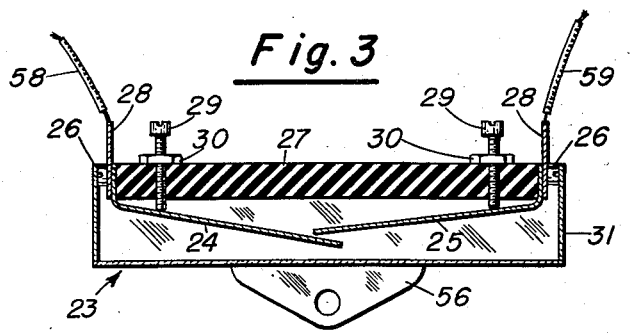
Inventor
Charles E. Hastings

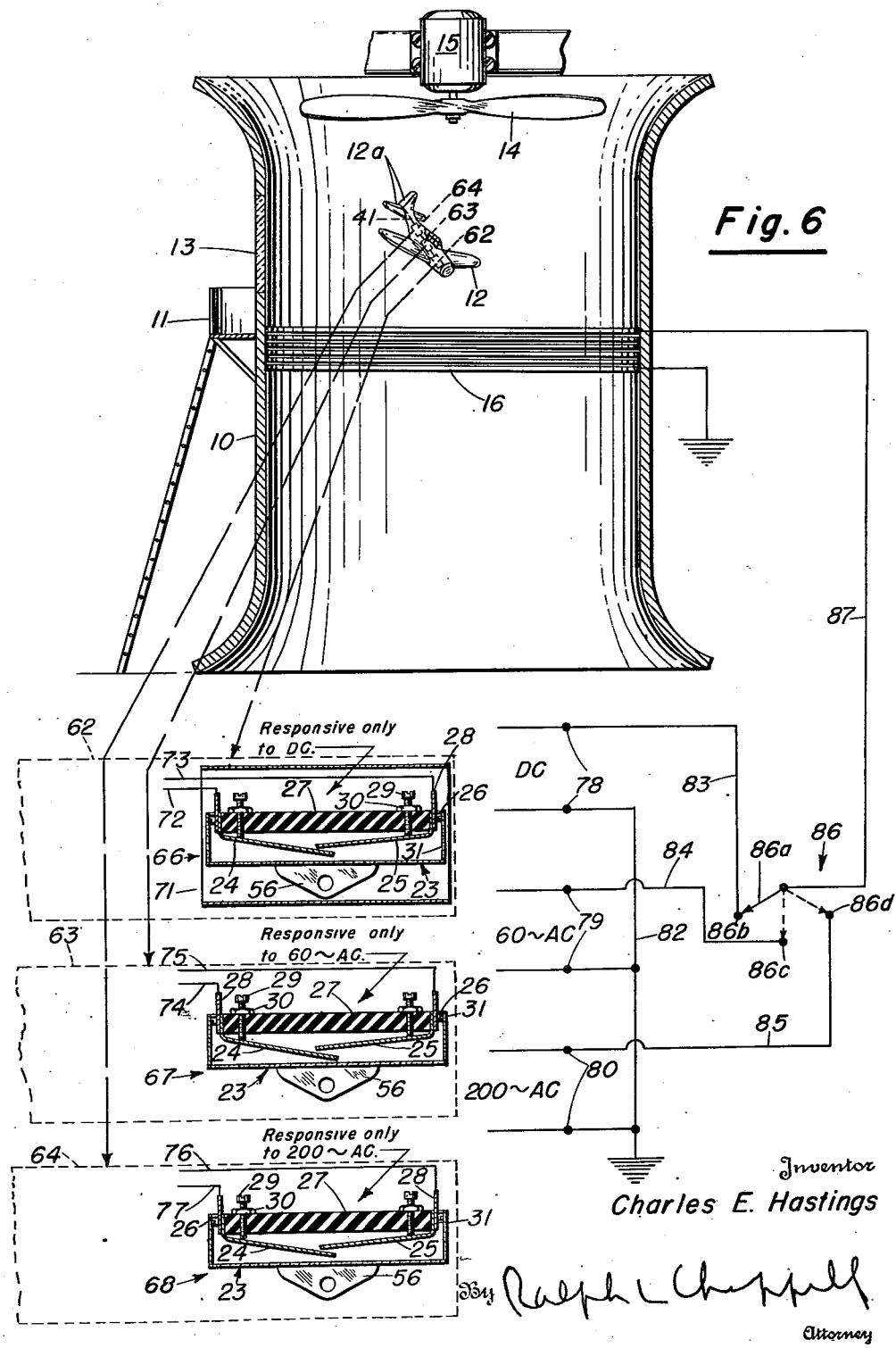

United States Patent Office 2,799,460
Patented July 16, 1957

2,799,460

REMOTE CONTROL APPARATUS

Charles E. Hastings, Elizabeth City County, Va.

Continuation of abandoned application Serial No. 617,416, September 19, 1945. This application July 6, 1951, Serial No. 235,551

5 Claims. (Cl. 244—77)

(Granted under Title 35, U. S. Code (1952), sec. 266)

This is a continuation of my application, 617,416, filed September 19, 1945 and now abandoned.

This invention relates in general to a remote control apparatus for remote control of electrical circuits or devices controlled thereby.

The general object of this invention is to provide a novel and improved arrangement for operating electrical switches and electrical circuits where electrical leads are objectionable or impractical and a radio control is undesirable because of its weight, cost, size, or because it requires standby current.

A specific object is to provide an improved wind tunnel arrangement by which any of the control surfaces of a model aeroplane launched in free flight inside the tunnel may be actuated at a time selected by an operator located outside of the tunnel and observing the model in flight.

Another specific object is to provide a small simple inexpensive and reliable means for operating electrical circuits or devices at a distance without requiring electrical leads, standby power, or delicate apparatus. To more clearly explain my invention I will limit my description to the specific application to the control of a model aeroplane built to scale and launched in a vertical wind tunnel. However, I desire it to be clearly understood that I do not wish to limit the scope of my invention to this application.

By remote control it is meant that the actuated mechanism is not placed as near as possible or made an integral part of the means for producing the actuating field.

These and other objects will become more apparent from the following detailed description to follow when considered with the accompanying drawings of which:

Fig. 3 is a longitudinal section along lines 3—3 of Fig. 4 of the magnetic switch that is responsive to a magnetic field produced inside the wind tunnel, and which is used to actuate the mechanism that trips the controls on the model aeroplane;

Fig. 4 is a top plan view of the magnetically operated trip mechanism for actuating the control surfaces of the model plane;

Fig. 5 is a side elevation of the trip mechanism; and

Fig. 6 shows a modified form of my invention wherein the operator may selectively control any one of a plurality of magnetic switches carried by the model plane.

Prior to my invention, the only way in which control could be exercised over a model aeroplane flying free in a wind tunnel was by use of an escapement or other fixed timing mechanism located in the plane and set for operation at some particular time. Thus for example, when tests are made on a model plane to determine its ability to recover from a spin, the control surfaces on the plane are initially set to a position that causes the plane, after it is launched in free flight within the tunnel, to take a spin attitude. An escapement type of time mechanism is carried within the plane. After a time interval, the length of which depends upon the setting of the escapement, the control surfaces of the model plane are shifted to positions which would normally bring the plane out of its spin attitude. An operator then observes the behavior of the plane after the controls are shifted to determine the spin recovery characteristics of the plane.

The escapement or any other type of fixed timing mechanism is not entirely satisfactory for the reason that once set for a given time, the operator has no further control over it, and hence, the time at which the control surfaces on the plane are to be shifted. This is undesirable because the operator thus has no means for choosing a time of operation of the plane's control surfaces when all conditions are properly adjusted and the model is in the field of view of the observer.

Now, however, by means of my invention, an operator located outside of the tunnel may, by merely actuating an electric switch, select the proper instant at which he desires the control surfaces of the model plane to be actuated.

My improved apparatus is comprised of a winding around the inside wall of the tunnel and which is energized to produce a magnetic field therein, a switch responsive to and controlled by the magnetic field created by the winding, and an electrically operated tripping mechanism that is controlled by the magnetic responsive switch for actuating the control surfaces of the plane.

Figure 1:
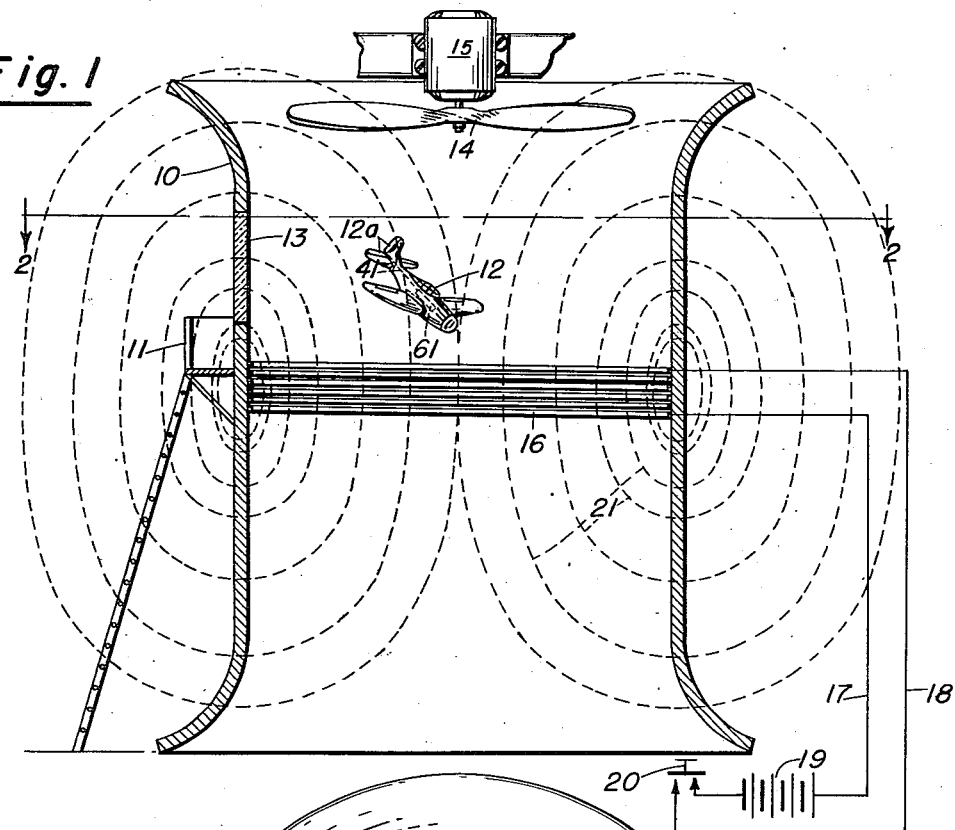
Fig. 1 is a vertical section through my improved wind tunnel arrangement.
Figure 2:
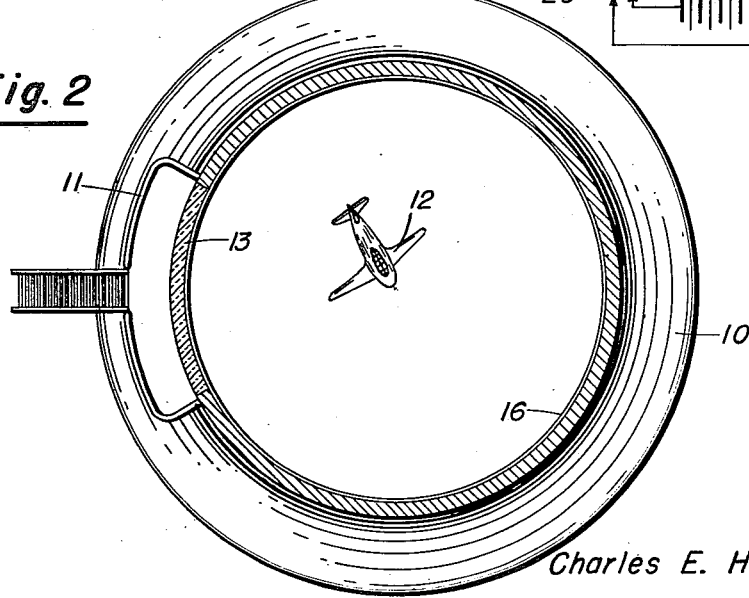
Fig. 2 is a transverse section taken on lines 2—2 of Fig. 1.

Referring now to Figs. 1 and 2, there is shown at 10 a wind tunnel of the vertical type. The tunnel which is of conventional construction includes a platform 11 extending part way around the outside wall upon which an operator may stand and observe a free flying model aeroplane 12 through a window portion 13. The model 12 may also be launched through the window 13 if desired.

At the top of tunnel 10 there is provided a propeller 14 driven by motor 15, the function of the propeller being to create an updraft through the tunnel. By regulating the speed of rotation of propeller 14, the model aeroplane 12 may be maintained in a selected position inside tunnel 10 where it will be constantly in the field of view of the operator. The air drawn up through the tunnel 10 passes downward on the outside of the tunnel, and then enters the tunnel at the bottom for recirculation. The structural arrangement which permits the air to be recirculated through the tunnel 10 has not been shown. It is not essential to this invention, and hence, has been deleted in the interest of simplifying the drawings to more effectively illustrate the principal features of this invention.

A coil 16 of insulated strap copper is placed around the inside wall of tunnel 10 and secured thereto by any suitable means. Conductors 17, 18 connect this coil to a source of direct current such as, for example, to storage batteries 19 through a switch 20 that can be so placed as to be actuated by the operator on platform 11. Rectifiers may replace the batteries 19, if desired. The number of turns on coil 16 and the current to be passed therethrough will depend upon the size of the tunnel 10 and the strength of the magnetic field which is required inside the tunnel to actuate the magnetic switch. The magnetic field produced by the coil 16 is indicated by lines 21.

Referring now to Fig. 3, the magnetic switch component that is actuated in accordance with the magnetic field established by current flowing through coil 16 and which is designated by reference numeral 23 is comprised of a pair of overlapped leaves or reeds 24, 25 which are slightly spaced from each other. The leaves are made from a high permeability material and silver plated to improve their conductivity. Leaves 24, 25 form electrical contacts and, when placed in the magnetic field 21 in such manner that they become substantially aligned with the axis of this field, the magnetic flux across the gap between the leaves causes them to be attracted to each other and close a circuit through them.

Leaf contacts 24, 25 are fixed by screws 26 to opposite ends of a support member 27 made from an insulating material, and the electrical connections are taken from terminal members 28. For adjusting the spacing between the leaf contacts 24, 25, there are provided the screws 29 which thread through the support 27 and can be locked in any position by nuts 30. An evacuated housing 31 of plastic material may be provided for enclosing leaf contacts 24, 25 in order to keep out dust, reduce contact arcing, etc.

Referring now to Figs. 4 and 5, the tripping mechanism previously referred to includes a base plate 32 with upright end members 32a for supporting three batteries 33 of the dry-cell type that are arranged in end-to-end relation so that their voltages are additive. Also carried on plate 32 is a horizontally arranged guide tube 34 for receiving a slide rod 35. An ear 36 inserted in a slot 37 formed in one end of rod 35, is provided with a plurality of apertures 38, and rods 41 or other suitable linkage means extended between the apertures 38 and the control surfaces 12a of the model plane 12. A portion of the bottom surface portion of guide tube 34 is cut away so that the trigger element 42 of a toggle unit 43 may engage an internal shoulder portion 44 formed in slide rod 35. The toggle unit 43 is pivoted about points 45, 46, and a weight 47 may be attached to one end thereof as a counterbalance.

For actuating the toggle unit 43, there is provided a translating device, such as a solenoid 48 containing an energizing coil 51 and an armature 52 pivoted at 53. To the armature 52 there is attached an offset arm 54, the end of which is engaged with pin 55 that also connects trigger 42 to arm 49 of the toggle unit 43.

The casing 31 of magnetic switch 23, previously described, is provided with a lug 56 for mounting to the base frame 32, and its contacts 24, 25 are connected in a series circuit between the batteries 33 and solenoid winding 51 via conductors 57, 58 and 59. Thus, whenever the contacts 24, 25 on switch 23 close, the circuit between the batteries 33 and solenoid winding 51 is completed and the latter is energized.

The tripping mechanism and magnetic switch which have been described constitute a unit 61 which is placed in the model plane 12 in the manner generally shown in Fig. 1. Slide rod 35 of the tripping mechanism and rods 41 connecting the slide rod 35 to the control surfaces 12a of the model plane 12 are pulled as far to the right as possible as shown in Fig. 5 against the action of an elastic band 92 and cocked in such position by the trigger 42 of the toggle unit 43. When the elements are in this position, the arrangement is such that the control surfaces 12a of plane 12 will have been moved to a position which will cause the plane to go into a spin attitude when launched.

*Operation*

With the control surfaces 12a of plane 12 cocked by the tripping mechanism into a position to throw the plane into a spin, the operator opens the window 13 in the tunnel 10 and launches the plane which then goes into a spin. If there were no updraft of air inside the tunnel, the plane would spin downwardly and soon go out of the field of view of the operator. In order to prevent this, the propeller 14 is started and its speed adjusted until the plane is maintained in a spin attitude at the height desired by the operator. With plane 12 substantially stationary so far as its height is concerned, the tail of the plane will then describe essentially a circle about its nose at substantially the center of the tunnel, that is, along the vertical axis of the tunnel.

Now when the operator considers that conditions are right for the test, he closes switch 20 to thus energize coil 16 from batteries 19 and establish the magnetic field 21. As this field threads through the switch 23, the magnetic sensitive leaf contacts 24, 25 are drawn into engagement and thus close the circuit between batteries 33 and the energizing coil 51 of solenoid 48. Armature 52 is thus drawn to the right which causes arm 54 to move downwardly and hence also push downwardly on pin 55 to thereby trip the toggle unit 43. When this occurs, the point of trigger 42 is disengaged from the shoulder portion 44 of slide rod 35 and thus permits the latter to shift to the left under the restoring force of the elastic band 92. This action causes rods 41 to be pushed to the left and shift the position of the control surfaces 12a of plane 12 in such a manner as would normally bring the plane out of its spin attitude. The operator then observes the plane's behavior with the controls shifted to determine its spin recovery characteristics.

Fig. 6 shows a modified form of my invention, as applied to remote control of model aircraft, wherein a plurality of magnetic control switches may be installed in the model plane 12 and each of which is adapted to be actuated selectively by the operator to control a separate mechanism in the plane. In this figure, the mechanisms are not shown in detail but are indicated generally by the boxes marked 62, 63 and 64. In these boxes there are positioned three switches 66, 67 and 68, respectively, all of which are the magnetic field responsive type. These switches are similar in construction to switch unit 23 shown in Fig. 3, and corresponding parts therein have been designated by the same reference numerals. However, in switch 66, there is provided in addition a copper cylinder 71 which surrounds the switch. The contact leaves 24, 25 of switch 67 are mechanically tuned to one frequency, say 120 cycles per second, and the leaves 24, 25 of switch 68 are mechanically tuned to a different frequency, say 400 cycles per second.

A 120 cycle mechanical natural frequency is necessary if the switch is to operate at an electrical frequency of 60 cycles. This arises from the fact that the leaves attract on both halves of the A. C. cycle. In other words the flux links the magnetic leaves twice for each cycle of alternating current and the leaves are therefore attracted at a rate of 120 times per second. Similarly for operation on 200 cycle alternating current, the leaves of the corresponding switch would have to have a mechanical natural frequency of 400 cycles.

Conductors 72, 73 lead from switch 66 to any device to be controlled thereby such as, for example, winding 51 on solenoid 48. In a similar manner, conductors 74, 75 and conductor 76, 77 lead from switches 67 and 68, respectively, to the devices which they control.

A source of direct current is brought in to terminals 78; a source of 60 cycle alternating current is brought in to terminals 79; and a source of 200 cycle alternating current is brought in to terminals 80. One side of each of the three different types of power supply is grounded through conductor 82. The other side of each of the different power supplies is fed via conductors 83, 84 and 85, respectively, to separate terminals of switch 86 which is adapted to be controlled by the operator. Operation of the Fig. 6 arrangement should be apparent. If the operator desires only magnetic switch 66 to close, he will move arm 86a of switch 86 into contact with switch terminal 86b. Direct current now feeds over conductor 83, through switch arm 86a, and over conductor 87 to energize the coil 16 in the tunnel 10. The other two magnetic switches 67 and 68 will not be affected by the direct current magnetic field produced in coil 16.

When it is desired to actuate only magnetic switch 67, switch arm 86a is moved to switch terminal 86c whereupon 60 cycle alternating current will be supplied to coil 16. Since the leaves 24, 25 of magnetic switch 67 are mechanically tuned to 120 cycles, the alternating field produced in coil 16 will cause them to vibrate at such an amplitude as to close a circuit between them. The copper sleeve 71 surrounding switch 66 prevents its contacts from being affected by the 60 cycle alternating current field, and the contacts of switch 68 being mechanically tuned to 400 cycles will not vibrate with sufficient amplitude to close.

Switch 68 only may be actuated by moving switch arm 86a to terminal 86d whereupon 200 cycle alternating current will be impressed across coil 16. Leaves 24, 25 of switch 68 being mechanically tuned to 400 cycles will thus vibrate in response to the alternations in the field produced by coil 16 with sufficient amplitude to close.

As previously stated, the switches 66, 67 and 68 may be used for any purpose desired and hence give the operator a means for controlling selectively any one of a number of different devices which may be carried on the model plane 12. Furthermore, it will be evident that other frequencies may be utilized and that, if desired, all of the magnetic switches may be made responsive to different frequencies of alternating current and the direct current power source deleted.

In conclusion, it is to be understood that while the described embodiments of the invention as applied to model aircraft in wind tunnels are to be preferred, changes may be made in the construction and arrangement of parts without departing from the spirit and scope of the appended claims.

The invention described herein may be manufactured and used by or for the Government of the United States of America for governmental purposes without the payment of any royalties thereon or therefor.

What is claimed is:

1. In combination with a movable object having connected therewith a directional control assembly including a plurality of controls, each of which governs movement of the object in a different direction, remote control apparatus comprising a stationary coil winding, means for energizing said winding with alternating currents of different frequencies to produce corresponding magnetic fields, said winding being remote from said object and the latter being movable to a position within said fields, a plurality of frequency selective switch means on said object each switch means having electrical circuit connections between said switch means and one of the controls in said control assembly, each of said switch means operative to close an associated electrical circuit to actuate one of the controls in said assembly when said object is positioned within said fields, one of said switch means including a pair of overlapped cantilever leaf springs of magnetic material, the natural frequency of which is double the frequency of a first one of said alternating currents and which springs flex towards each other when said winding is energized with alternating current of said first frequency, and another of said switch means being similar to said first mentioned switch means but in which the leaf springs thereof have a natural frequency double the frequency of a second one of said alternating currents.

2. Apparatus for remote control of an aircraft comprising in combination, an aircraft having control surfaces and a plurality of control circuits; each of said circuits including a source of power, a solenoid having a movable armature, frequency selective switch means coupled to said solenoid and to said power source, the switch means of each circuit being responsive to a remotely controlled magnetic field of a given frequency to complete the circuit between the power source and the solenoid, each switch means being responsive to a different frequency, and linkage interconnecting the armature of each solenoid and at least one of said control surfaces; whereby the different control surfaces of the aircraft may be operated.

3. Apparatus for remote control of an aircraft comprising a solenoid having a movable armature operatively connected to control surfaces of the aircraft; a source of power connected to said solenoid; switch means coupled to said power source and to said solenoid, said switch means being responsive to a remotely controlled magnetic field and including a pair of overlapped cantilever leaf springs of magnetic material which flex toward each other to complete the circuit between the power source and the solenoid, thus operating said control surfaces.

4. Apparatus for remote control of an aircraft comprising in combination an aircraft having control surfaces and a plurality of control circuits; each of said circuits including a source of power, a solenoid having a moveable armature, and frequency selective switch means coupled to said solenoid and to said power source, each of said switch means comprising a pair of overlapped cantilever leaf springs of magnetic material and which flex toward each other to complete the circuit, said pairs of springs being tuned to different frequencies and being responsive to remotely controlled magnetic fields; and linkage interconnecting the armature of each solenoid and at least one of said control surfaces; whereby the different control surfaces of the aircraft may be operated individually by establishing magnetic fields of proper and differing frequencies.

5. In an aircraft having control surfaces, a circuit comprising a solenoid having a moveable armature, a source of power and a switch, said switch being responsive to a remotely controlled magnetic field to complete said circuit, control means operatively connected to said control surfaces, said control means normally occupying a first position in which the control surfaces are maintained in level flight condition, releasable means biasing said control means to a second position in which the control surfaces are maintained in a spin condition, said armature being connected to said releasable means, whereby actuation of said switch actuates said solenoid, causing the armature to move the releasable means to an inoperative position, thus allowing the control means to return to the normal position thereof and causing the aircraft to return to level flight.

References Cited in the file of this patent

UNITED STATES PATENTS

| | | |
|---|---|---|
| 1,709,212 | Green | Apr. 16, 1929 |
| 1,736,613 | McCoshen | Nov. 19, 1929 |
| 1,865,826 | Brockstedt | July 5, 1932 |
| 2,264,124 | Schreiner | Nov. 25, 1941 |
| 2,289,830 | Ellwood | July 14, 1942 |
| 2,325,829 | Boswau | Aug. 3, 1943 |
| 2,409,168 | Walker | Oct. 8, 1946 |

FOREIGN PATENTS

| | | |
|---|---|---|
| 237,334 | Great Britain | July 22, 1925 |

OTHER REFERENCES

Wind Tunnel Technique, by Pankhurst and Holder, pp. 126–128 inclusive, a book published at the Pitman Press, Kingsway, London.